(12) United States Patent
Bergan et al.

(10) Patent No.: US 6,944,603 B2
(45) Date of Patent: Sep. 13, 2005

(54) FRACTAL SEMANTIC NETWORK GENERATOR

(75) Inventors: Elias Bergan, Horgen (CH); Jürgen Klenk, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 708 days.

(21) Appl. No.: 09/888,698

(22) Filed: Jun. 24, 2001

(65) Prior Publication Data

US 2002/0013793 A1 Jan. 31, 2002

(30) Foreign Application Priority Data

Jun. 24, 2000 (EP) ............................................. 00113437

(51) Int. Cl.[7] .............................................. G06F 17/00
(52) U.S. Cl. .............................. 706/45; 706/47; 706/55
(58) Field of Search ............................... 706/45, 47, 55

(56) References Cited

U.S. PATENT DOCUMENTS 6,076,088 A * 6/2000 Paik et al. ..................... 707/5
6,263,335 B1 * 7/2001 Paik et al. ..................... 707/5
6,523,172 B1 * 2/2003 Martinez-Guerra et al. . 717/143

* cited by examiner

Primary Examiner—George Davis
(74) Attorney, Agent, or Firm—Ference & Associates (57) ABSTRACT

A method, system, and a program storage device readable by machine, tangibly embodying a program of instructions executable by the machine to perform method steps for processing an input string to generate a fractal semantic network. The fractal semantic network is obtained by parsing the input string to generate an initial parse structure which comprises a plurality of parse elements. Semantic units are generated from some of the parse elements by employing a set of mapping rules for mapping certain types of parse elements into the semantic units such that some of the semantic units are information objects and some are connection objects. The fractal semantic network is generated by arranging the information objects and connection objects in a fractal manner, where the relation between the information objects is represented by the connection objects. The information objects and the connection objects are derived from a small set of basic building blocks.

46 Claims, 10 Drawing Sheets

SEMANTIC UNIT DECISIONS:

60 {
0-element of the Syntax Type String = 'NOUN' --► object 'INFORMATION'
0-element of the Syntax Type String = 'VERB' --► object 'INFORMATION'
0-element of the Syntax Type String = 'SUBCONJ' --► object 'INFORMATION'
0-element of the Syntax Type String = 'PREP' --► object 'INFORMATION'
0-element of the Syntax Type String = 'DET' --► object 'ATTRIBUTE'
0-element of the Syntax Type String = 'ADV' --► object 'ATTRIBUTE'
0-element of the Syntax Type String = 'ADJ' --► object 'ATTRIBUTE'
0-element of the Syntax Type String = 'INFTO' --► object 'ATTRIBUTE'
0-element of the Syntax Type String = 'QUAL' --► object 'Information 61    62

CONNECTION DECISIONS:

63 {

1) SyntaxTypeString (element 0) = VERB
   Slot (element 0) = the other word's position
   OtherSyntaxType String (element 0)= NOUN ──► Create agentrole connection (typ 0)

2) SyntaxTypeString (element 0) = VERB
   Slot (element 1) = the other word's position
   OtherSyntaxTypeString (element 0) = NOUN
   No passive form
   No gerund form ──► Create objectrole connection (type 1)

3) other words entry type is 2

──► Create attribute connection

4) SyntaxTypeString (element 0)= NOUN
   OtherWord = WITH

──► Create scaling exchange connection

5) OtherSemanticalTypeString = NNOUN

Fig. 6A

SyntaxTypeString (element 0) = NOUN

→ Create HorizontalRelation 6) word = WHILE
otherSyntaxTypeString (element 0) = VERB → Create horizontal relation (type 12)

7) otherWord = WHILE
syntaxTypeString (element 0) =VERB

→ Create horizontal relation (type 12)

63 { 8) syntaxTypeString (element 0) = VERB
otherSyntaxTypeString (element 0) = VERB
Gerund form → Create agent role connection (type 0)

9) SyntaxTypeString (element 0)=VERB
Slot (element 2) = the other word's position
OtherSyntaxTypeString (element 0) = NOUN
No passive form → Create beneficiary role connection (type 7) (indirect object)

Fig. 6B

FRACTAL SEMANTIC NETWORK GENERATOR

This application claims priority from European Patent Application No. 00113437.8, filed on Jun. 24, 2000, and which is hereby incorporated by reference as if fully set forth herein.

FIELD OF THE INVENTION

The present invention concerns the processing of an input string or input text in order to generate an input network and in particular a fractal semantic input network.

BACKGROUND OF THE INVENTION

Natural language understanding is a topic that is attracting a lot of attention since it eventually will allow improvement of the interface and interaction between humans and machines, such as computers, personal digital assistants (PDAs), or cellular phones, for example. Natural Language Processing (NLP) is vital in natural language interfaces, machine translation, automatic abstracting and in a number of other computer-based applications.

Despite a lot of efforts, the advances in natural language understanding are not very satisfying. In particular, the research area of automated apprehension of meaning from speech or from text has not made much progress over the last years.

In the area of automated apprehension of meaning there are two different philosophies, the "holistic" approach and the "componentized" approach. While the latter approach has achieved a great number of detailed results in the individual components such as anaphora resolution and deep syntactic analysis, among many others, it has not yet achieved the goal of combining these individual components to one global and overall solution within which these components can interact. It is even unclear at the moment whether there exists for these components any suitable form of combination that includes feedback mechanisms.

When it comes to understanding the meaning of speech, i.e. the semantical interpretation of speech, the breakthrough has not yet been achieved. As a consequence, the pragmatical analysis, the control of tools and devices by natural speech, has also not been developed very far. A typical example of a modem speech/text recognition system is described in the article "Enabling agents to work together", by R. V. Guha et al., Communications of the ACM, Vol. 37, No. 7, July 1994, pp. 127–142, and reviewed by T. J. Schult in the German article "Transparente Trivialitäten; Cyc-Wissensbasis in WWW", c't, 1996, Vol. 10, pp. 118–121. The Cyc-system described by R. V. Guha is a knowledge based system for true/false categorization of input statements. T. J. Schult points out in his article that the knowledge representation in the database used in the Cyc-system is not standardized and uses only the following relations for deduction: 'is element of', 'is subset of', and 'has subsets'. The system described by Guha is what we call a "holistic" system.

In the present context, we focus on the "holistic" approach that is also referred to as the cognitive approach. A fractal semantic knowledge database is employed in order to be able to perform a meaning understanding task. This kind of an approach has been used by others before, but the present model to represent the world knowledge in a knowledge database modeled as a fractal semantic network is unique and has a number of important differences compared to all other models around. In particular, a self-similar hierarchical network of n-th order is employed, as for example disclosed and claimed in PCT Patent application WO 99/63455, International Application No.: PCT/IB99/00231, entitled "Processing of Textual Information and Automated Apprehension of Information", currently assigned to the assignee of the present application. Furthermore, local pervasive intelligence is employed, as specified in the German Patent application "Fraktales Netz n-ter Ordnung zum Behandeln komplexer Strukturen", application No.: 199008204.9, filing date 15 February 1999, assigned to the assignee of the present application and to Delphi Creative Technologies. This local pervasive intelligence is called a Janus, using a name of the Roman mythology (plural: Jani). The Janus is described in very general terms in this German patent application. These two patent applications are incorporated in their entirety.

It is to be noted that there is a fundamental difference between data or information and knowledge. One can accumulate arbitrary amounts of data or information without having any knowledge, while the converse is not possible. Data or information is the isolated representation of pure facts, while knowledge arises from strong connections between these facts, from connections between facts and their environment, and from abstraction, which in turn allows both for performing understanding and learning.

An approach for the meaning understanding based on a fractal semantic knowledge base is described and claimed in co-pending patent application with title "MEANING UNDERSTANDING BY MEANS OF LOCAL PERVASIVE INTELLIGENCE". This patent application was filed on the same day and is currently assigned to the same applicant as the instant patent application. This patent application is incorporated in its entirety. According to this co-pending case, local pervasive intelligence (realized by means of Janus objects) is employed in order to process an input network. During the processing of this input network, knowledge is extracted from the knowledge base. This enables such a system to automatically apprehend (understand) what was conveyed in the input network. Before such a meaning understanding task can be carried out, some preparational work is required.

Linguists and programmers have developed and are developing parsers that are able to parse subsets of a language. So far, modern linguistic theories did not lead to parser implementations that have enough lexical information to be able to parse a substantial subset of the English language, for instance. This is due to the fact that linguistic theories cannot deal with all exceptions that a natural language contains, and, therefore, the parsing sometimes fails, generating either wrong or corrupt outputs.

One parser giving good results is the English Slot Grammar (ESG) parser developed by Michael McCord of International Business Machines Corporation.

It would be desirable to provide an efficient scheme for the conversion of an input string or input text into an input network suited for meaning understanding.

It would also be desirable to provide a system for the efficient conversion of an input string or input text into an input network suited for meaning understanding.

SUMMARY OF THE INVENTION

The present invention concerns the conversion of an input string or input text into an input network that has a fractal semantic structure.

The present invention further concerns a specific fractal semantic input network for use in connection with the automated apprehension, interpretation or meaning understanding of information conveyed in an input string.

In one aspect, the present invention provides a method which processes an input string to generate a fractal semantic network, the method comprising the steps of: parsing said input string to generate an initial parse structure comprising a plurality of parse elements; generating semantic units from some of said parse elements by employing a set of mapping rules which maps certain types of said parse elements into said semantic units, whereby some of said semantic units are information objects and some are connection objects; generating said fractal semantic network by arranging said information objects and said connection objects in a fractal manner, where the relation between said information objects is represented by said connection objects, whereby said information objects and said connection objects are derived from a small set of basic building blocks.

In another aspect of the present invention, a system processes an input string to generate a fractal semantic network, the system comprising: a parser which processes said input string to generate an initial parse structure comprising a plurality of parse elements; a processing module which converts said initial parse structure into said fractal semantic network, comprising components which generate self-similar information objects from some of said parse elements by employing a first set of mapping rules for mapping certain types of parse elements into said information objects; which generate self-similar connection objects from some of the parse elements by employing a second set of mapping rules for mapping certain types of parse elements into said connection objects; and which arrange said information objects and said connection objects in a fractal manner according to the relation between the respective information objects and connection objects, where the relation between the information objects is represented by the connection objects, whereby the information objects and the connection objects are derived from a small set of basic building blocks.

Furthermore, the present invention provides a program storage device readable by machine, tangibly embodying a program of instructions executable by the machine to perform method steps for processing an input string to generate a fractal semantic network, said method comprising the steps of: parsing said input string to generate an initial parse structure comprising a plurality of parse elements; generating semantic units from some of said parse elements by employing a set of mapping rules which maps certain types of parse elements into said semantic units, whereby some of said semantic units are information objects and some are connection objects; generating said fractal semantic network by arranging said information objects and said connection objects in a fractal manner, where the relation between said information objects is represented by said connection objects, whereby said information objects and said connection objects are derived from a small set of basic building blocks.

The present invention can be used for meaning understanding in natural language, but also for speech analysis, language translation, information retrieval and other applications which require some sort of natural language processing.

For a better understanding of the present invention, together with other and further features and advantages thereof, reference is made to the following description, taken in conjunction with the accompanying drawings, and the scope of the invention that will be pointed out in the appended claims.

BRIEF DESCRIPTION OF THE DRAWINGS

Preferred embodiments of the invention will now be described with reference to the following schematic drawings.

DETAILED DESCRIPTION OF THE PREFERRED EMBODIMENTS

In the following, the basic concept of the present invention is described. Before addressing different embodiments, the relevant terms and expressions are defined and explained.

The expression "textual information" is defined to be any kind of written information, or information contained in speech. "Textual information" is meant to represent natural language. This expression is also meant to represent natural language transmitted through a network or phone system, and the like.

The term "input string" is used as a synonym for any kind of input that can be processed by a software-based computer system. It can be a continuous structured or unstructured string of bits, for example. It can also be some other representation of information, e.g., a frequency spectrum as generated by a speech processing system. The term "input string" is also meant to stand for a plurality of parallel input strings suited for parallel processing.

Figure 1A:
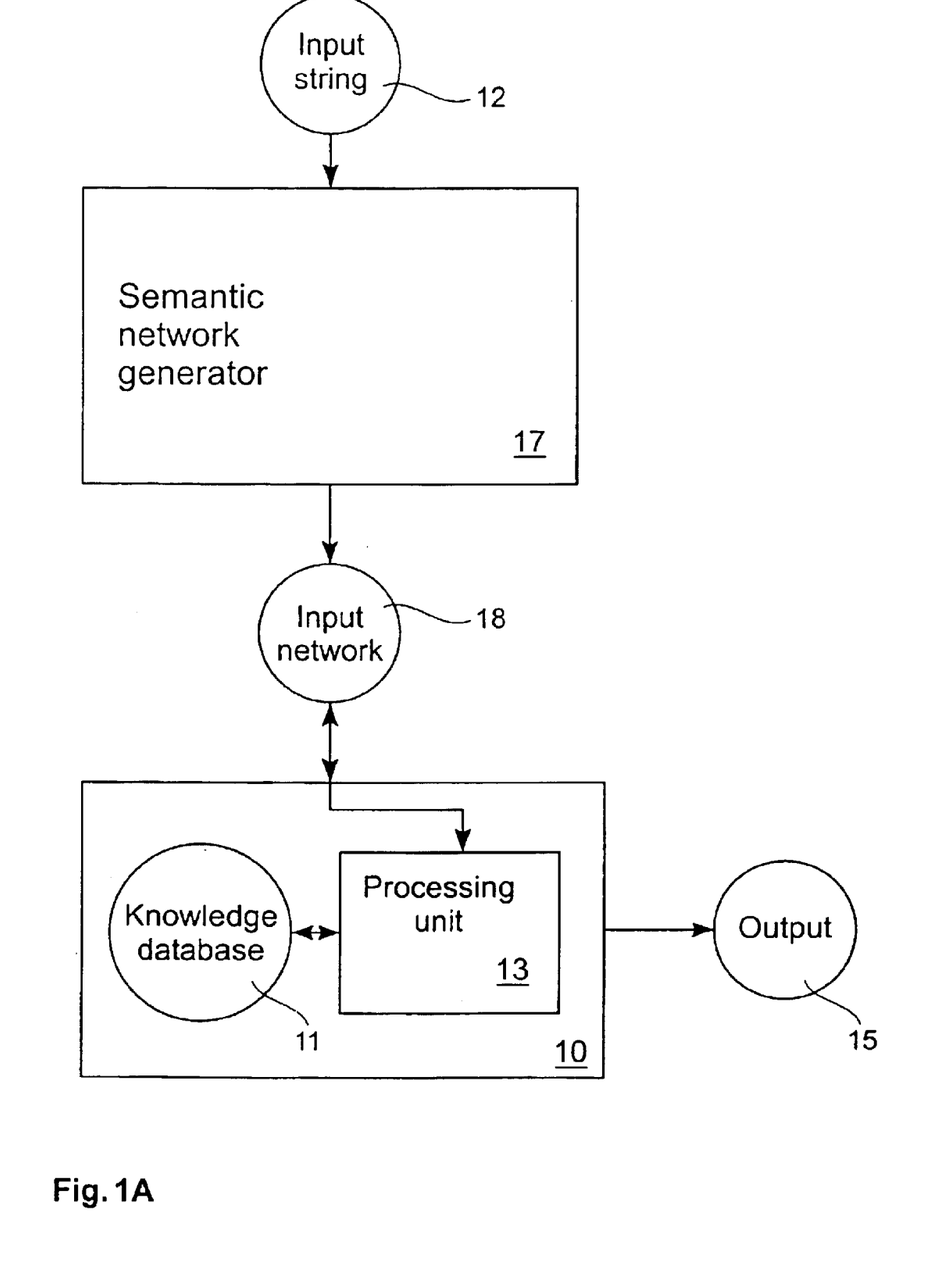
FIG. 1A is a schematic block diagram of a meaning understanding system, according to the co-pending patent application filed on the same day as the instant patent application.

As illustrated in FIG. 1A, there is some sort of an input string 12 that needs to be processed. Such an input string 12 may be generated by a speech recognition system that automatically turns the speech input into a string 12. An input network 18 has to be generated from the input string 12 since the meaning understanding system 10, as disclosed in the co-pending patent application that is filed on the same day as the instant patent application, requires such a network 18 as a starting point. According to this copending patent application, the processing of the input network 18 is carried out by special Janus objects. There is a knowledge database 11 that is examined when processing the input network 18, whereby knowledge in this knowledge database 11 is used for meaning understanding.

Figure 1B:
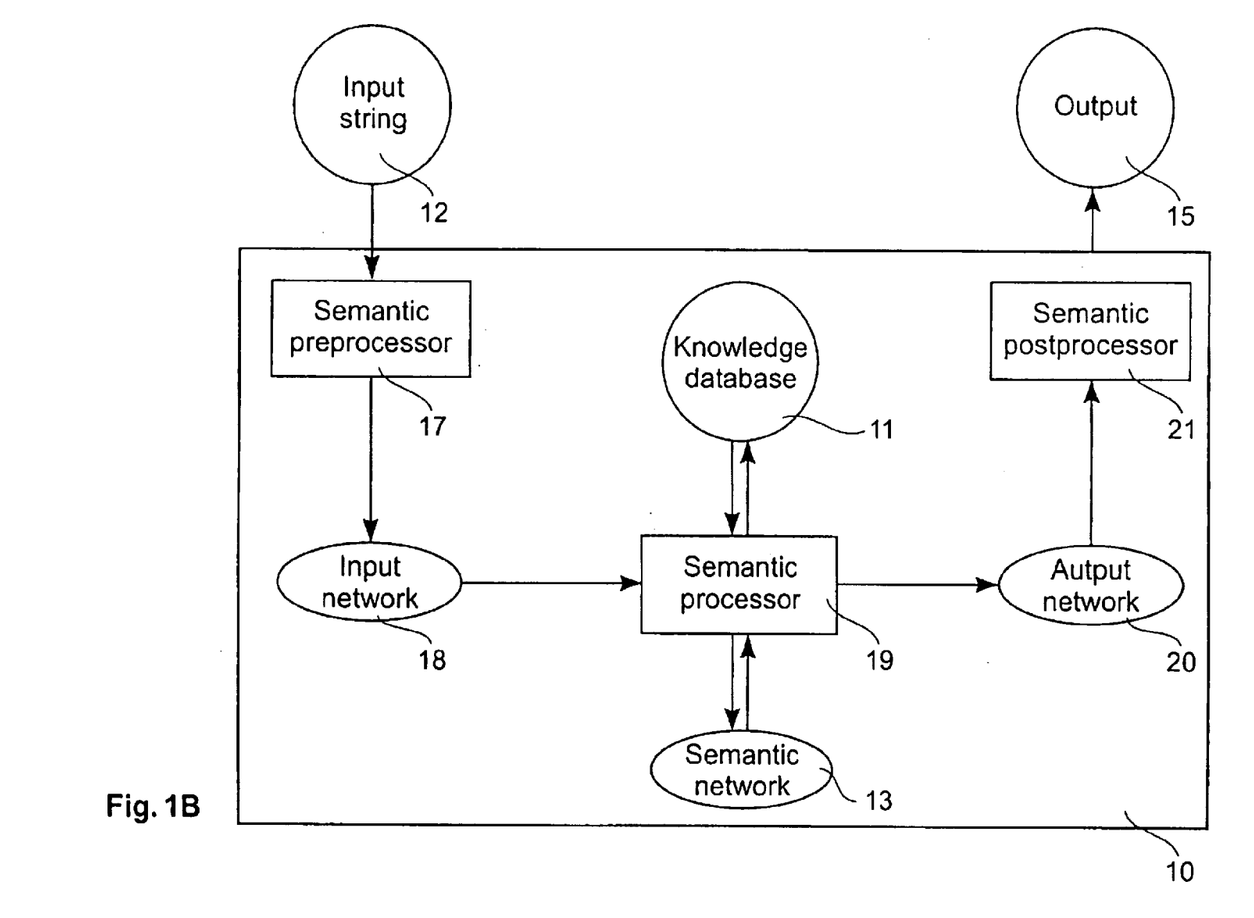
FIG. 1B is a schematic block diagram of a meaning understanding system, according to the above-mentioned PCT Patent application WO 99/63455.

Another setup is described in the PCT Patent application WO 99/63455. A schematic representation of one such setup is illustrated in FIG. 1B. According to this PCT application, a meaning understanding system 10 may comprise the units depicted in FIG. 1B. An input string 12 is in this embodiment processed by a semantic preprocessor 17 that converts the string 12 into an input network 18. The semantic processor 19 then uses the input network 18 as input.

For the purpose of the present description we call the module that converts an input string 12 into an input network 18 a "fractal semantic network generator" 17 (or semantic network generator). The input network 18, according to the present invention, is a first guess of the input string's semantic units (e.g., objects, attributes, and their relation). That is, the conversion performed by the fractal semantic network generator 17 structures the input string 12. The input network 18 also contains grammatical information such as tense, case, declination, and so forth.

The term network is herein used to describe a collection or aggregation of entries/elements. These entries/elements are—at least to some extent—connected/linked by pointers or connection objects. A simple example of a network (input network 18) is given in FIG. 4. In this example, the network 18 comprises five objects 50.1–50.5 and four pointers 51.1–51.4 (i.e., nine semantic units).

We continue with the basic definitions of semantic and hierarchical networks.

A semantic network is a directed or non-directed graph with the additional property that its nodes and pointers carry semantic information. Nodes and pointers of a semantic network are called semantic units. The semantic information provides a particular meaning for a semantic unit. Frequently, semantic information is encoded in natural language, i.e. specific names or processes are used to label semantic units.

A hierarchical network is a directed or non-directed graph with the additional property that some of its pointers carry scaling information. This means that one of the nodes connected to a scaling pointer is at a higher level of hierarchy than the other node.

It should be noted that this definition does not yield an absolute value for the level of hierarchy, i.e. it does not assign to every node an integer that corresponds to its level of hierarchy. Instead it gives a relative definition for the level of hierarchy.

The knowledge database 11 is of hierarchical and semantical nature and all elements are alike, so that the knowledge database 11 has a fractal structure, i.e., it is self-similar across hierarchies. Algorithms can operate on elements at any hierarchical level in the same way, making them 'fractal' algorithms.

This knowledge database 11 may have a unique structure as for example described in the PCT Patent application WO 99/63455. All elements and aspects of the knowledge database 11 that are relevant for the understanding of the present invention are addressed below.

Knowledge database: A knowledge database is a kind of library describing the knowledge of the world, or a particular area of interest thereof, by using a fractal semantic network structure.

When referring to a knowledge database, either a library describing knowledge of the world, or a library with domain specific information is meant, or a mixture of both. An example of a domain specific knowledge database is a database which comprises knowledge relevant for the processing of insurance claims.

Self-similar local algorithms can be used when making use of the knowledge contained in this knowledge database.

According to the present invention, the input network 18, like the knowledge database, is of hierarchical and semantical nature and all its elements are alike.

Semantic units: A semantic unit is a set that contains one or several pieces of information. It may be represented by a word, an object, a relation, an attribute, a combination of words and/or objects and/or relations and/or attributes and/or or modules, a (hierarchical) network of words and/or objects and/or relations and/or attributes and/or modules, a part of a sentence or a whole sentence, a part of a paragraph or a whole paragraph, or a part of a story or a whole story.

Figure 2A:
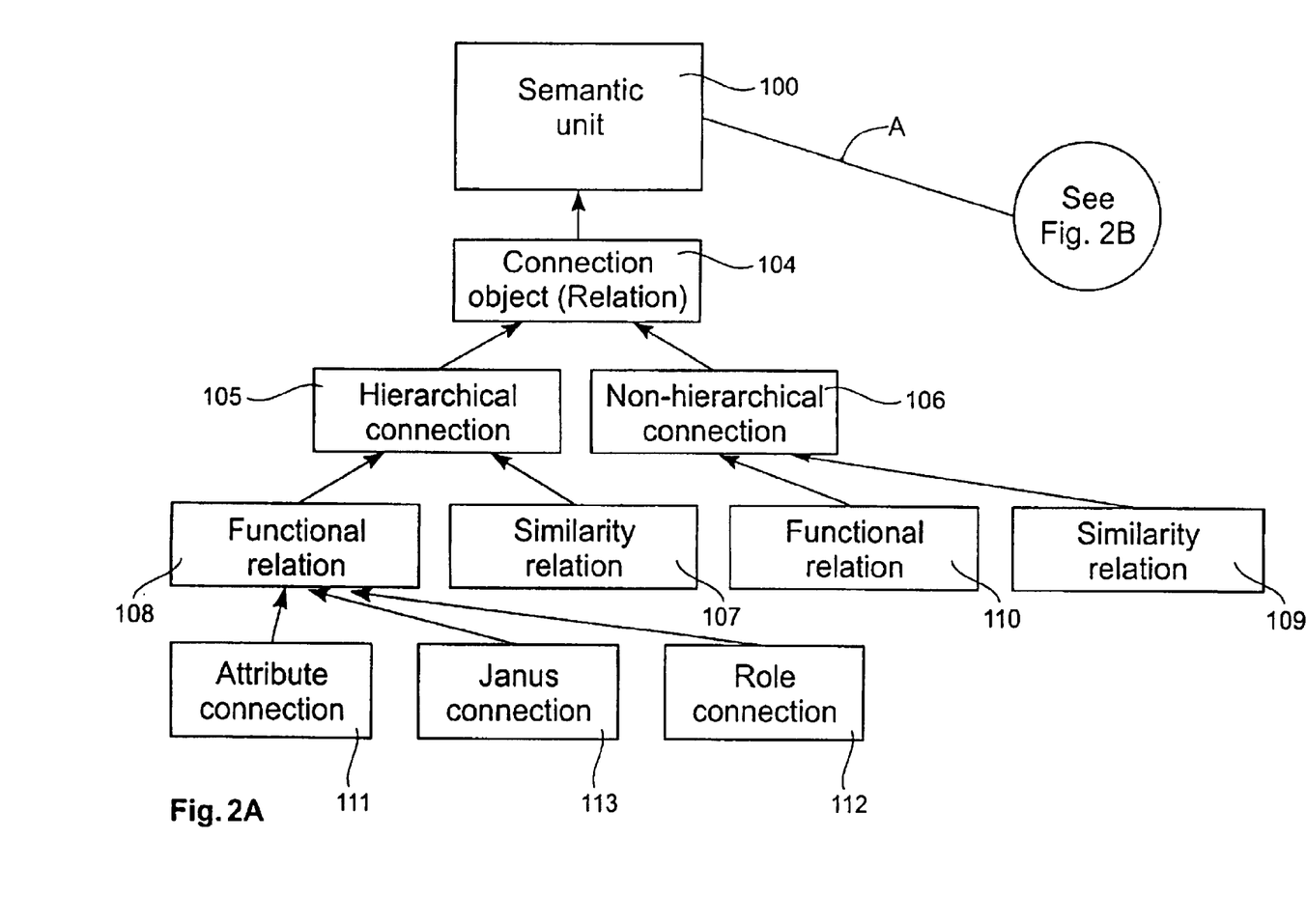
FIG. 2A and FIG. 2B show the various elements (semantic units) of a fractal semantic knowledge database. This representation is a generalization of what is described in the above-mentioned in PCT Patent application WO 99/63455.
Figure 2B:
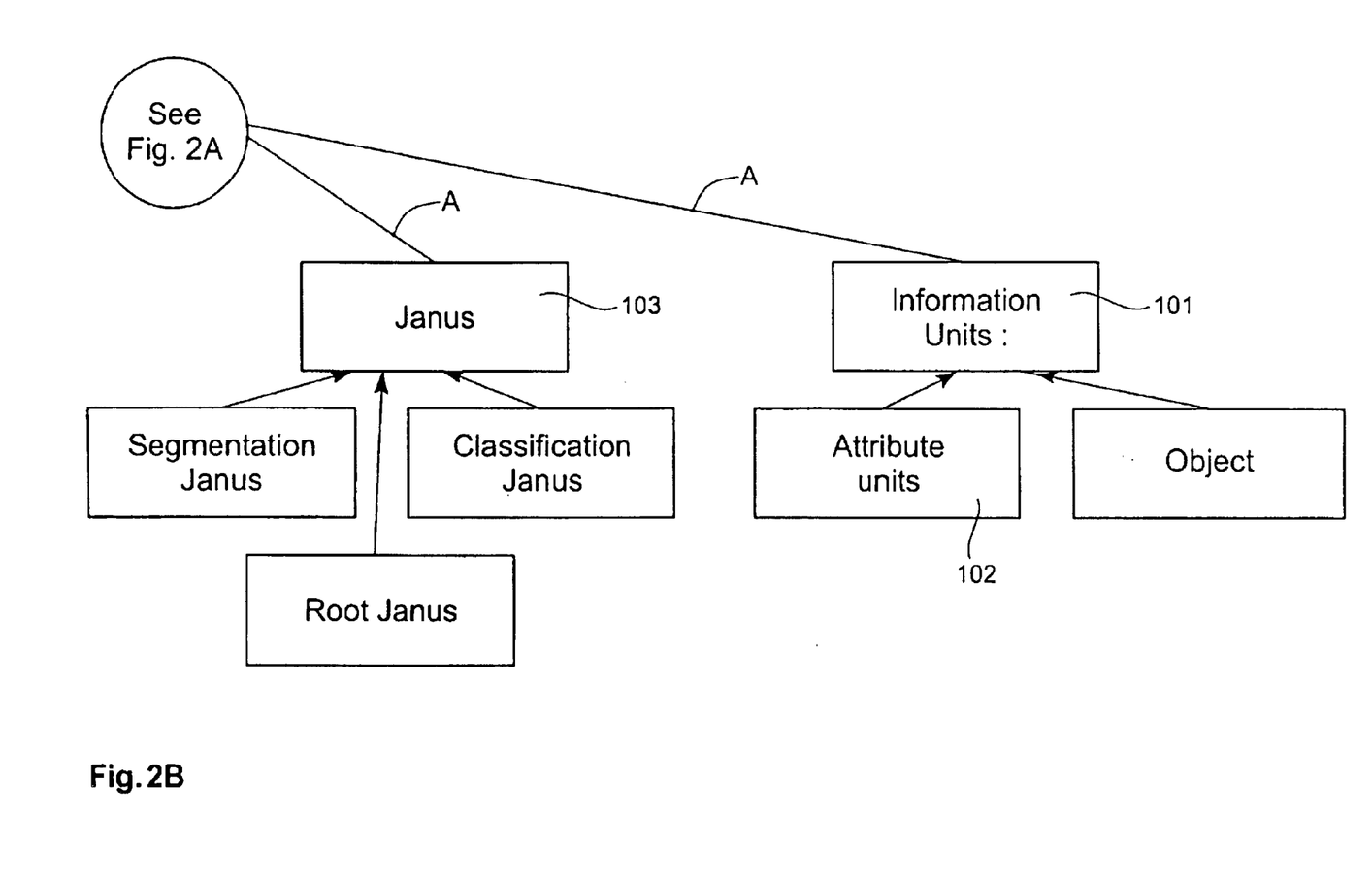

Exemplary types of semantic units and their possible mutual connections, are schematically illustrated in FIGS. 2A and 2B. The input network 18 may comprise the semantic units illustrated in these Figures.

Figure 4:
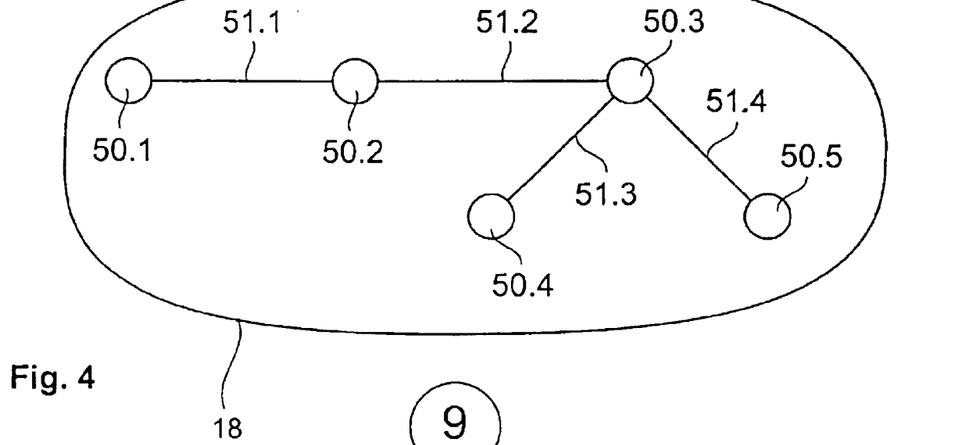
FIG. 4 shows part of a fractal semantic input network, according to the present invention.

A simple example of an input network 18 with semantic units 50.1–50.5 and 51.1–51.4 is illustrated in FIG. 4. The objects 50.1–50.5 are represented by circles and the pointers by lines 51.1–51.4.

A higher-order network is a directed or non-directed graph in which pointers can at the same time be nodes. This means that a pointer can connect two nodes, one node and one pointer, or two pointers.

In the next definitions it is captured what is meant by a fractal network. A working definition is given which will suffice for the scope of the present description. In particular, the presently used formulation allows us more easily to define the self-organizing fractal semantic network and to understand the various embodiments and implementation details given.

A fractal network is a hierarchical network with the additional property that all of its nodes and pointers are derived from a small set of basic building blocks. In this sense a fractal network exhibits a self-similar structure because it looks the same everywhere on all levels of hierarchy.

As specified above, nodes and pointers of a network are called semantic units (cf. FIGS. 2A and 2B). All semantic units 100 are subdivided into concepts and instances. We further subdivide nodes into information units 101, attribute units 102, and processing units or Janus Objects 103. Information units are general elements that can represent concepts or instances, and they are identified by specific names. Attribute units 102 are identified by specific names and values, which can be set, retrieved, or computed.

All pointers of the network (connection objects 104) are either scaling (hierarchical connections 105) or non-scaling scaling (non-hierarchical connections 106). Standard inheritance principles are defined across all scaling pointers, making use of the network's topology or neighborhood concept. The notion of topology and the neighborhood concept are addressed in the co-pending patent application that was filed on the same day as the instant application. Pointers are further subdivided into comparison units 107, 109, interaction units 108, 110, description units 111, role units 112, and controller units 113. Non-scaling comparison units 109 allow us to describe the degree of similarity or dissimilarity of two semantic units, while scaling comparison units 107 allow us to describe how close one semantic unit comes to being an instance of another semantic unit, or how close one semantic unit comes to being a special case of another semantic unit. Non-scaling interaction units 110 allow us to describe the type of interaction of two semantic units, while scaling interaction units 108 allow us to describe the 'role' one semantic unit plays with respect to another semantic unit. Description units connect semantic units to their attribute units, which describe the semantic units in more detail. Role units describe the role one semantic unit plays with respect to another semantic unit. Finally, controller units connect semantic units to their Janus Objects 103, which in turn control and act upon the semantic units' local neighborhoods.

In accordance with the above definition, a network is called a fractal semantic network, if the following four conditions are satisfied:

All nodes are similar (derived from one template) across all hierarchies.

All pointers are similar (derived from one template) across all hierarchies.

Pointers may also be nodes across all hierarchies.

Hierarchical pointers are possible, and at least one node must have a hierarchical pointer.

The construction of a fractal semantic network can be achieved as follows. The network is given by a list of semantic units 100 and pointers (connection objects 104), as illustrated in FIGS. 2A and 2B. There might be different types of semantic units (as defined above) and pointers (similarity pointers 107, 109, functional pointers 108, 110, attribute pointers 111, and role pointers 112, also defined above). These pointers can be oriented upwards, downwards, or horizontally. The various semantic units 100 are interconnected in various ways. Some of the pointers 105 are hierarchical representing the multiscale approach. Knowledge can thus be presented in the input network 18 as an associative network.

A semantic unit may be linked by associative pointers to its associative semantic unit(s). These associative pointers reflect how one understands each semantic unit. It is emphasized that these pointers can exist between any two semantic units. The pointers themselves may be regarded as semantic units that can have pointers to other semantic units, reflecting the fact that something could act on the association between two semantic units rather than on the individual semantic units. Due to the fractal organization of the input network 18, as outlined above, an input string can be significantly restructured.

The well-defined fractal structure of the input network 18 greatly simplifies the task of trying to understand the information that is mapped from the input string 12 into the input network 18, as will be addressed now.

Extracting knowledge from the knowledge database 11 in order to enrich the information originally contained in an input network 18 can be done in a very efficient manner due to the fact that the input network has a fractal semantic structure. Using a local and iterative approach—as described in the co-pending patent application that was filed on the same day as the instant application—one can use the knowledge contained in the knowledge database 11 to perform the understanding task of what is conveyed in the input string 12. The key is that this is done locally, making use of the fractal structure of the knowledge database 11, triggered by elements of the input network 18.

The herein proposed schemes and systems are based on the above-described special model of textual information and natural language. According to this model, natural language as well as textual information consists of semantic units which are grouped at different levels of hierarchy and are all of a similar type.

According to the present invention, it is advantageous to generate an input network 18 out of an input string 12 that has a fractal semantic network structure like the knowledge database 11. Preferably, the knowledge database 11 and the input network 18 are all represented in what is called a higher-order fractal semantic network. The input network 18 of a speech input 12 (e.g., a string representing question) may be created by locating its semantic units, possible relations, possible attributes, and possible roles. A meaning understanding scheme may then be employed to generate a meaningful output 15.

It is advantageous for a subsequent meaning understanding process that the structure of the input network 18 and the knowledge database 11 are similar, since such a subsequent meaning understanding process attempts to bridge or merge the input network 18 and portions of the knowledge database 11.

Figure 3:
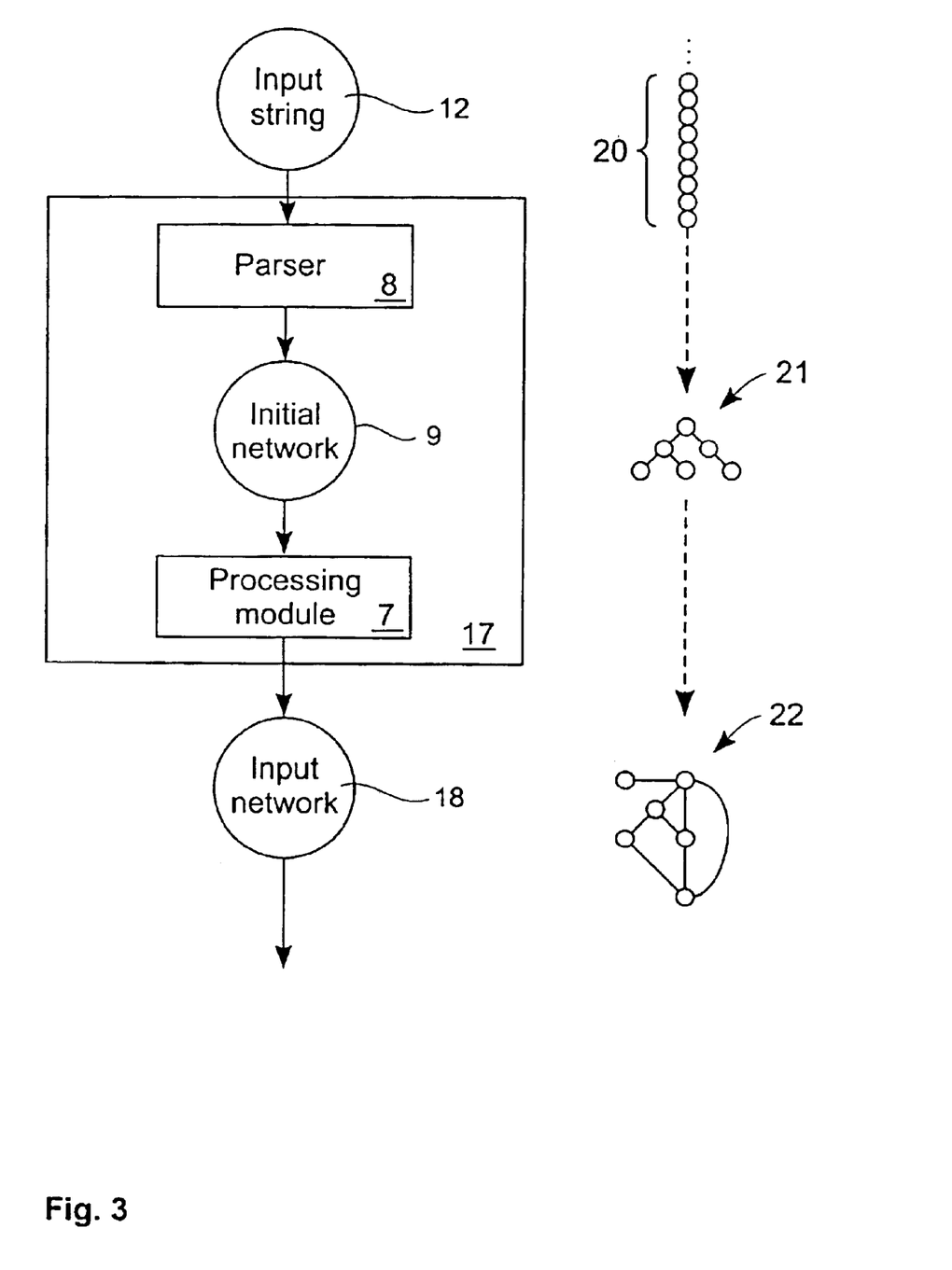
FIG. 3 is a schematic block diagram of a processing system, according to the present invention.
Figure 5A:
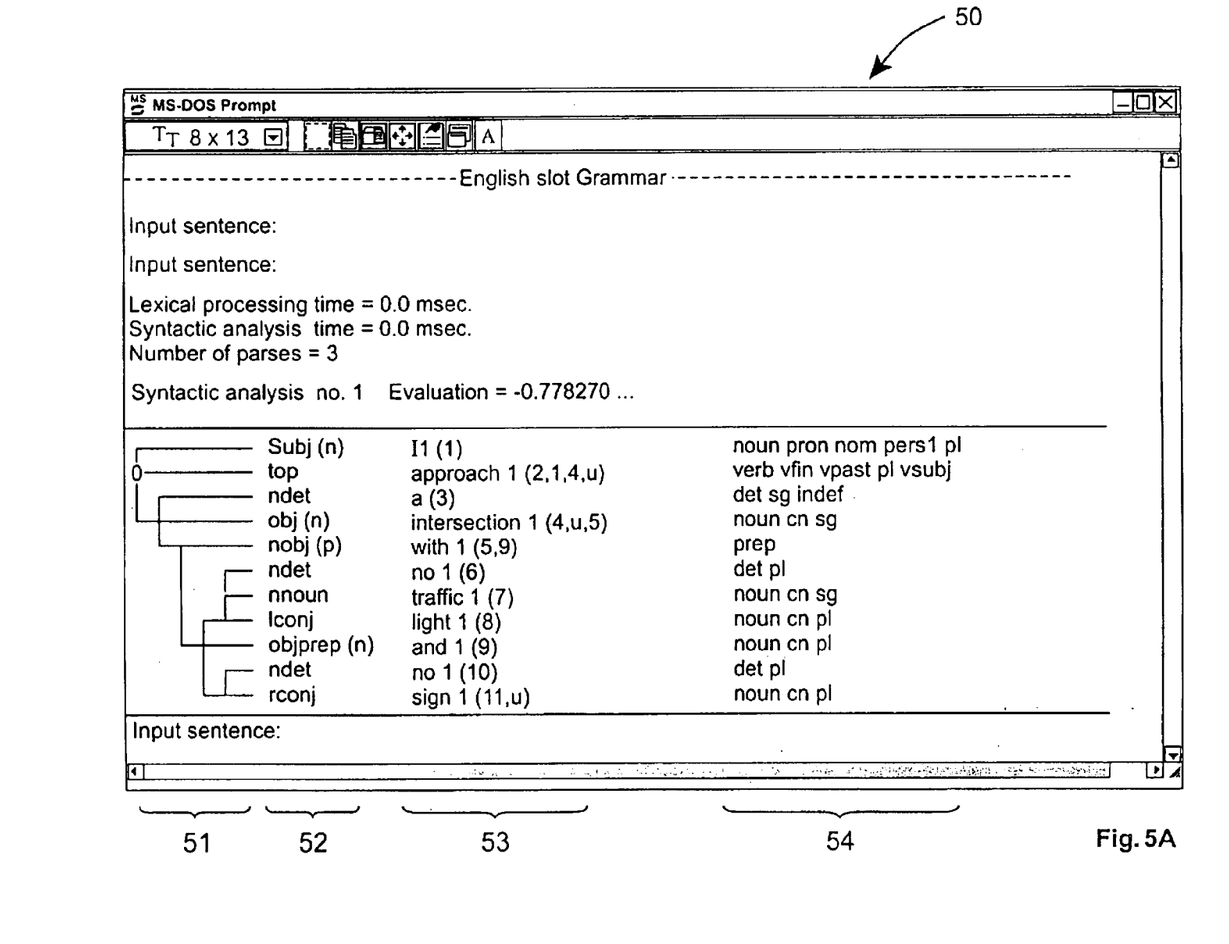
FIG. 5A shows a screen shot of the parse structure generated by the ESG parser.

As illustrated in FIG. 3, a parser 8, according to the present invention, is employed that transforms the input string 12 into an initial network 9. This initial network 9 is referred to as initial parse structure. It may be a tree-structured network 21, as illustrated in FIG. 3, or an appropriate other formalistic representation 50, as illustrated in FIG. 5A. The semantic network generator 17 further comprises a processing module 7 that converts the initial network 9 into the desired input network 18.

Even without a parser a hierarchical network may be generated as long as there is some unit that parses the input string in order to generate parse elements. The parsing in this case can be a simple mapping.

In the present embodiment, the fractal semantic network generator 17 comprises a parser 8 that generates a tree-structured network 21. The whole conversion from a string of text 20 (e.g. one single sentence) via the tree-structured network 21 to a fractal semantic network 22 is schematically illustrated on the right hand side of FIG. 3.

Preferably, an ESG parser is employed. Details of this ESG parser are addressed in the following two exemplary publications: McCord, M. (1990), "A System for Simpler Construction of Practical Natural Language Grammars", R. Studer (ed.), Natural Language and Logic, Lecture Notes in Artificial Intelligence 459, London and New York, Longman; and Lappin, S. & M. McCord (1990), "Anaphora Resolution in Slot Grammar", Computational Linguistics, 16(4), pp. 197–212.

There is also an IBM US patent with U.S. Pat. No. 5,737,617, which addresses certain aspects of McCord's work, in particular a method and system for English text analysis.

Slot grammar is a formalistic representation of information conveyed in input strings. It allows this information to be represented in a manner (herein called parse structure) that can be processed by a computer system. The ESG parser is capable of processing many of the phenomena of a natural language, such as the English language. The development of slot grammar parsers for languages other than English is in progress.

The ESG parser delivers parse structures showing both surface structure and deep structure. Preferably, the parser produces a parse structure that resembles a tree structure (e.g. the tree structure 21 of FIG. 3). Usually, the parser delivers one parse structure per input sentence and preferably one single tree per input sentence 20. The ESG parser processes an input string 12 and yields a parse structure with slot information for each sentence of the input string 12. In addition, a variety of miscellaneous syntactic and semantic information is added to each word of the input string 12.

A typical parse structure 50 with miscellaneous syntactic and semantic information is illustrated in FIG. 5A. FIG. 5A is a screenshot that is generated by the ESG parser after having processed the following sentence (input string 12): <<I approached an intersection with no traffic lights and no signs.>>

The first column 51 of the parse structure 50 represents the relationship between the various parse elements in this sentence. The second column 52 shows the semantic information of all parse elements in this sentence (the parse element characterizes a word, or a phrase, and describes its meaning) is used. The parse element can even be a comma or the like. The word "I" is for example characterized as the subject of the sentence. In the third column 53, the word stem, the meaning, and the slot information is given. The number 1 before the parenthesis in the expression "approach1(2,1,4,u)" means the first meaning of the word "approach" is used in the sentence. The lexical information used by the parser indicates that there are several different meanings for the word "approach". Within the parenthesis the 2 refers to the second word of the sentence, that is, it indicates that the word "approach" is related to the first word "I". The number 4 indicates that the subject "I" "approach" the "intersection" (the fourth word in the sentence). The lexical information of the ESG parser knows for many words the corresponding slot information. Whenever the word "approach" appears as a verb in a sentence, then the parser tries to locate the subject ("I") and the object ("intersection"). The fourth digit in the expression "approach1(2,1,4,u)" shows a "u" which stand for "unknown" and is related to different usage of "approach" for which still another slot may be filled. The last column 54 gives feature information about features of each word in the sentence to the extent known by the parser. I.e., this column represents and describes the syntax of the sentence. The word "I" is identified as being a noun, a pronoun, a nominative form, and the $1^{st}$ person. This syntactic information is the result of a deep syntactic analysis followed by a shallow semantic analysis of the sentence. It is obvious that what is shown in FIG. 5A (the parse structure 50) can be represented in many different formats.

In general terms, the ESG parser returns semantic information, syntactic information, information concerning the relationship/association between some or all of the words of the sentence, and feature information. In addition, the ESG parser returns the individual words of the sentence.

According to the present invention, a fractal semantic network generator 17 is defined that creates a fractal network of semantic units (referred to as a fractal semantic network), where the semantic units are derived from the individual words, from the semantic information, and from the syntactic information. In addition, the present semantic network generator 17 also processes the information concerning the relationship/association (e.g., the information given in the first column 51 and in the third column 53 of the screenshot 50) between some or all of the words, such as the tree structure provided by the ESG parser.

Figure 6A:
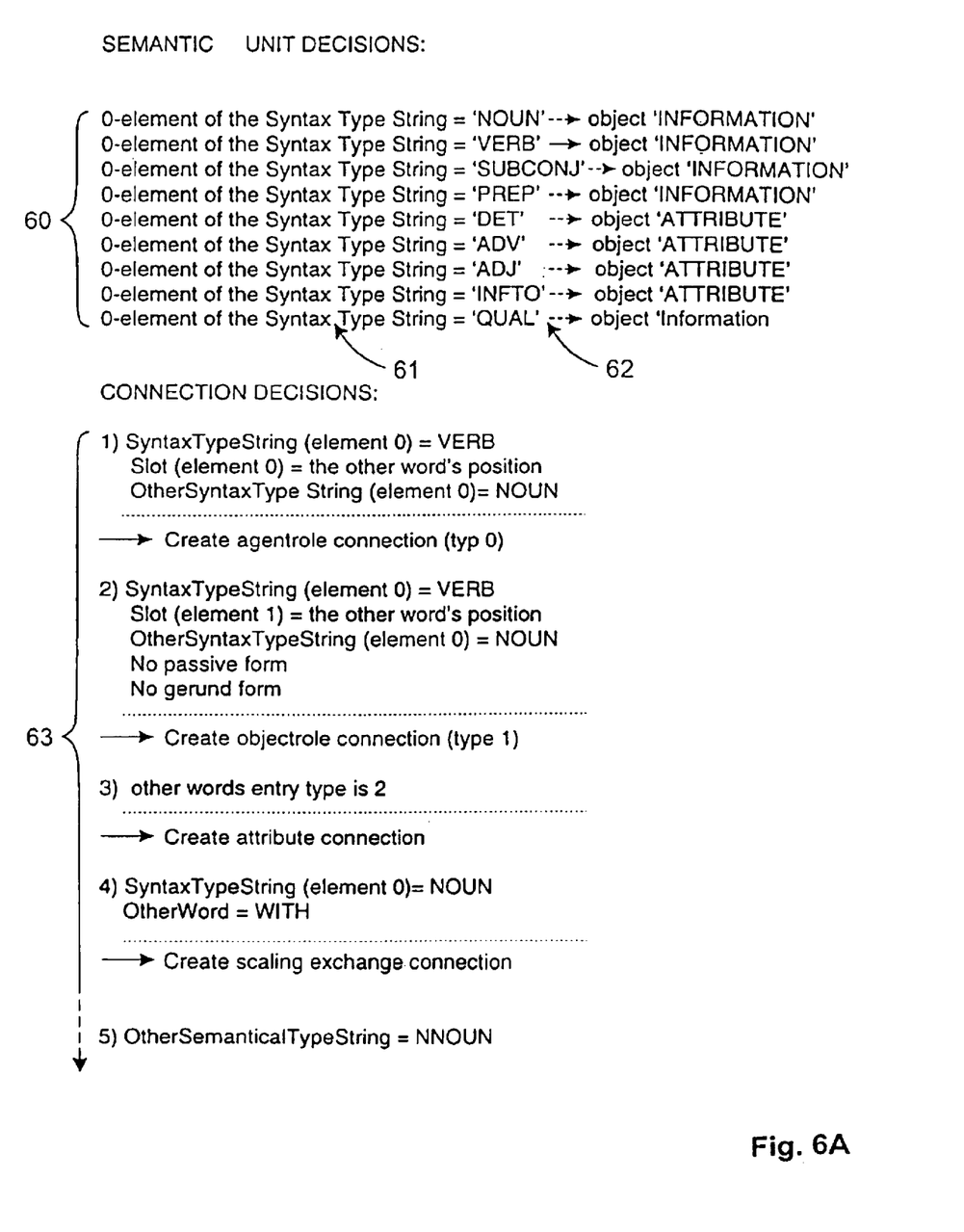
FIG. 6A and 6B show a 'pseudo code' representation of a semantic network generator, according to the present invention, implemented in software.
Figure 6B:
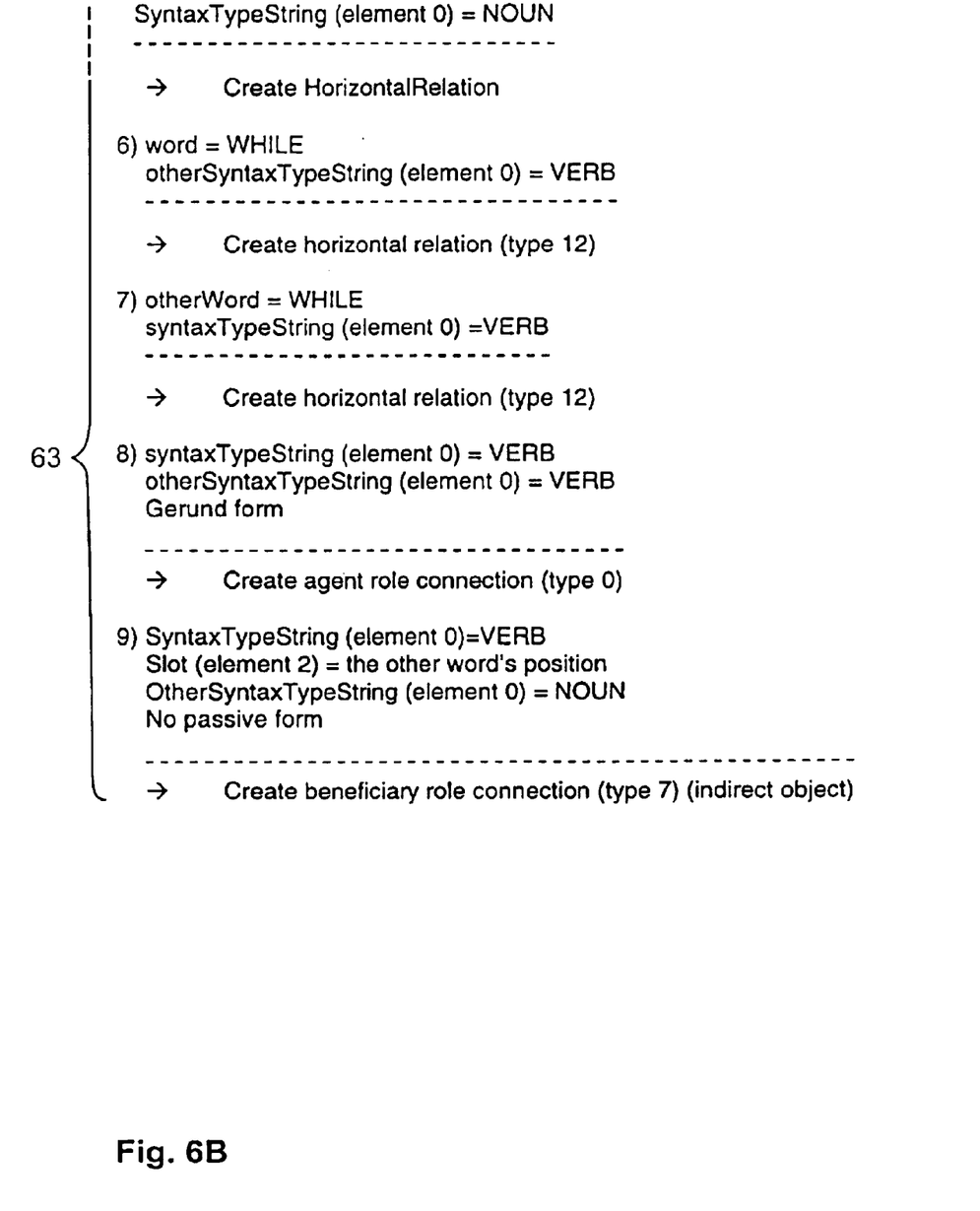

A schematic representation of the basic software components (in pseudo code format) of one embodiment of the present invention are illustrated in FIGS. 6A and 6B. The first software component 60 shows the mapping of information 61 provided by the ESG parser into corresponding semantic units 62. In the present embodiment, nouns, verbs, qualifiers, subordinary conjunctions, and prepositions are mapped into information objects, whereas determiners, adverbs, adjectives, and infinitive to are mapped into attribute objects.

The second software component 63 deals with the conversion of information taken from the parse structure into connection objects. The present embodiment has nine different modules (1–9) for this conversion. The pseudo code is to be read like an instruction. The sign "|" means OR, the sign "<>" means NOT EQUAL, and the sign "=" means EQUAL. One has to handle/process two words (word and otherWord in the present example). Every variable that starts with the word "other" refers to the other word (the second word), or else the variable refers to the original word (first word). The first module 1) checks whether a verb (element 0) has been identified in the parser's syntactic information (e.g. column 54 in FIG. 5A). The module then looks at the slot information of this verb (slot of element 0) to find another word's position in the sentence. If this other word is a noun, which can be verified by looking at this other word's syntactic information in the parse structure 50, then an agent role connection is generated in the input network 18. The second module 2) generates an object role connection, the third module 3) an attribute connection, the fourth module 4) a scaling exchange connection, the fifth module 5) a horizontal relation, the sixth module 6) a special horizontal relation, the seventh module 7) yet another special horizontal relation, the eighth module 8) an agent role connection, and the ninth module 9) a beneficiary role connection. Otherwise, unspecified connections are created.

According to one particular embodiment of the present invention, the above rules can be reformulated if that is deemed convenient.

Figure 7:
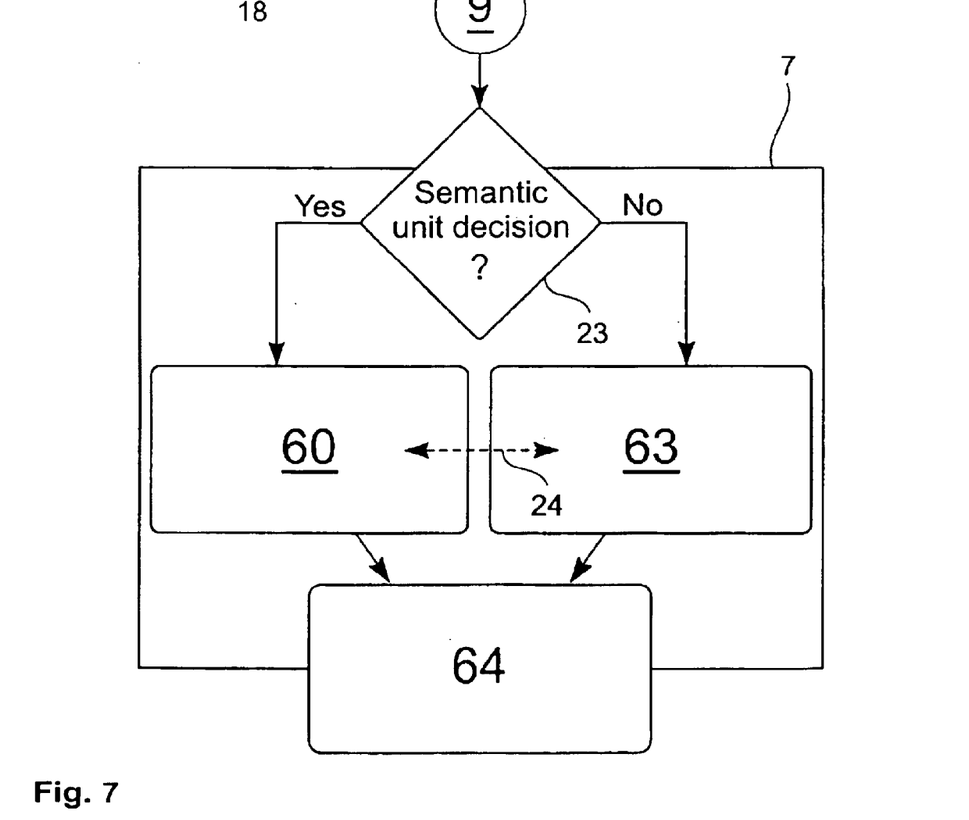
FIG. 7 shows a schematic block diagram related to a semantic unit decision, according to the present invention.

The two software modules 60 and 63 process the information received from the initial network 9 in a manner illustrated in FIG. 7. In a first step, a unit 23 decides whether the received information is to be fed to the first software module 60 or the second module 63. This can be done by trying to make a distinction between semantic units that have to be processed by module 60 and semantic units that have to be processed by the module 63.

A possible implementation is to check whether the information received requires a semantic unit decision. If the answer is yes the information is forwarded to module 60. Otherwise, the information is forwarded to the module 63. Optionally, there may also be an exchange of information between the two modules 60 and 63, as indicated by the arrow 24.

These two modules 60 and 63 feed another module 64 that generates the fractal semantic input network 18 out of the information provided to it by the modules 60 and 63. For this purpose, the module 64 arranges the information accordingly. It either comprises a memory or it has access to an external memory (e.g. a disk drive) where the input network 18 is generated. This is done by storing the semantic units, by linking the semantic units, and so forth.

Figure 5B:
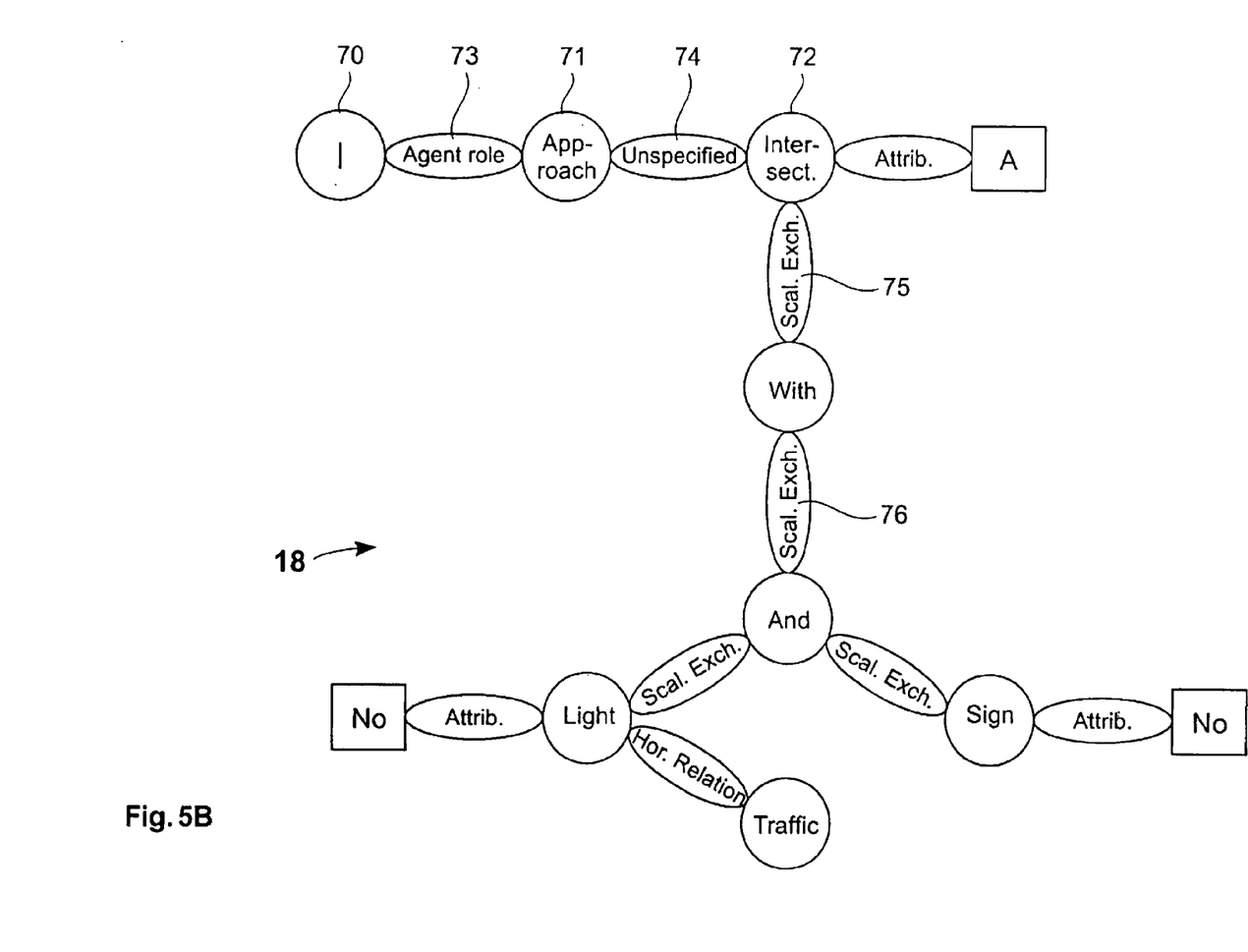
FIG. 5B is a graphical representation of a fractal semantic input network generated by a system in accordance with the present invention.

Using the first software component 60, the second software component 63, and the module 64 (which in most implementations also is realized as software) one can transform the initial network 9 into a fractal semantic network 18. Still referring to the single sentence given above, the resulting fractal semantic input network 18 is illustrated in FIG. 5B. As discussed in connection with the word "approach", there is somebody or something that approaches somebody or something else. Here, the sentence states that "I approach intersection". This is represented in the input network 18 by the semantic units 70–74. The sentence further reveals some specifics about the "intersection". The fractal semantic network generator 17 is able to recognize that the preposition "with" is a bridge between the word "intersection" and the partial sentence "no traffic lights and no signs". The generator 17 notices (understands) that the "intersection" is characterized in that is neither has traffic lights nor signs. All this information is thus placed on a lower level in the fractal semantic network's hierarchy. Scaling exchange connections 75 and 76 (hierarchical connections) are used to link the word "intersection" with the words of this partial sentence.

Note that this is just one implementation example. One can add additional mapping/conversion rules, or one can modify or even omit certain of these rules. It is obvious, that the use of fewer rules may lead to less reliable results. The more exceptions one includes in creating an input network, the more reliable will the resulting input network be.

It is to be noted that some or all of the above processes lead to a logical rearrangement/restructuring of the elements of the initial network 9. The result of the present semantic network generation scheme may not necessarily be reflected in that any physical changes take place inside the initial network 9. The pointers and the like may be pointers in some table or memory space, for example, that become rearranged during the generation of the input network 18.

Note that the input network 18 will never be completely satisfactory. It will always be a naive guess until the knowledge database 11 is confronted.

According to a special implementation of the present invention, an exception output (e.g. a file) is generated for those portions of the input string 12 that cannot be parsed into parse elements (e.g. if the parser fails) or for those semantic units that do not seem to fit into the input network 18. The exception output can be processed by a special tool to allow a subsequent parsing into semantic units or a subsequent inclusion in the input network 18. This special tool may allow a user to interact with the system 7. The system 17 may comprise an input device (e.g., a keyboard) for allowing human interaction.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention If not otherwise stated herein, it is to be assumed that all patents, patent applications, patent publications and other publications (including web-based publications) mentioned and cited herein are hereby fully incorporated by reference herein as if set forth in their entirety herein.

What is claimed is:

1. A method which processes an input string to generate a fractal semantic network, the method comprising the steps of:
   parsing said input string to generate an initial parse structure comprising a plurality of parse elements;
   generating semantic units from some of said parse elements by employing a set of mapping rules which maps certain types of said parse elements into said semantic units, whereby some of said semantic units are information objects and some are connection objects; and
   generating said fractal semantic network by arranging said information objects and said connection objects in a fractal manner, where the relation between said information objects is represented by said connection objects, whereby said information objects and said connection objects are derived from a small set of basic building blocks.

2. The method of claim 1, whereby said parse elements comprise a classifier characterizing the type of said parse element, and a representation describing the relation between said parse elements, and feature information describing the features of said parse element.

3. The method of claim 2, wherein said representation describing the relation between said semantic units is examined when generating said fractal semantic network.

4. The method of claim 1, whereby there are hierarchical connection objects and non-hierarchical connection objects.

5. The method of claim 4, whereby due to the fact that said hierarchical connection objects are employed, said fractal network structure having at least two levels of hierarchies.

6. The method of claim 1, whereby said fractal semantic network is self-similar across all hierarchies since said information objects and said connection objects are derived from said small set of basic building blocks.

7. The method of claim 1, wherein said input string is a sequence of m words, preferably a single sentence.

8. The method of claim 7, wherein m semantic units are created during said parsing step, with one semantic unit per word, or per sentence, or per a whole story.

9. The method of claim 1, wherein an exception output is generated for those portions of said input string that cannot be parsed into parse elements or that do not seem to fit into said fractal semantic network.

10. The method of claim 9, wherein said exception output can be processed by a special tool to allow a subsequent parsing into parse elements or a subsequent inclusion in said fractal semantic network.

11. The method of claim 10, wherein said special tool allows human interaction.

12. The method of claim 1, wherein lexical information is taken into consideration during said parsing step.

13. The method of claim 1, wherein grammar rules are taken into consideration during said parsing step.

14. The method of claim 1, wherein word stemming is applied.

15. The method of claim 1, wherein a syntactic analysis and/or a semantic analysis of said input string is performed during said parsing step.

16. The method of claim 1, wherein said set of mapping rules comprises a first set of rules which define that parse elements representing nouns, verbs, qualifiers, subordinary conjunctions, or prepositions are mapped into said information objects.

17. The method of claim 1, wherein said set of mapping rules comprises a second set of rules which define that parse elements representing determiners, adverbs, adjectives, and infinitives are mapped into attribute objects.

18. The method of claim 1, wherein said fractal semantic network is a first guess of the input string's words.

19. The method of claim 1, wherein knowledge is presented in said fractal semantic network as an associative network.

20. A system which processes an input string to generate a fractal semantic network, the system comprising:
   a parser which processes said input string to generate an initial parse structure comprising a plurality of parse elements; and
   a processing module which converts said initial parse structure into said fractal semantic network, wherein processing module components
      generate self-similar information objects from some of said parse elements by employing a first set of mapping rules for mapping certain types of parse elements into said information objects,
      generate self-similar connection objects from some of the parse elements by employing a second set of mapping rules for mapping certain types of parse elements into said connection objects, and
      arrange said information objects and said connection objects in a fractal manner according to the relation between the respective information objects and connection objects, where the relation between the information objects is represented by the connection objects, whereby the information objects and the connection objects are derived from a small set of basic building blocks.

21. The system of claim 20, wherein said parse elements comprise a classifier characterizing the type of the parse element, and a representation describing the relation between the parse elements, and feature information describing the features of the parse element.

22. The system of claim 20, wherein said parser is a slot grammar parser.

23. The system of claim 20, wherein there are hierarchical connection objects and non-hierarchical connection objects.

24. The system of claim 23, wherein due to the fact that hierarchical connection objects are employed, said fractal network structure has at least two levels of hierarchies.

25. The system of claim 20, wherein said fractal semantic network is self-similar across all hierarchies since said information objects and said connection objects are derived from said small set of basic building blocks.

26. The system of claim 20, wherein the system generates an exception output for those portions of said input string that cannot be parsed into parse elements by said parser or for those semantic units that do not seem to fit into said fractal semantic network.

27. The system of claim 26, further comprising a special tool to allow the subsequent parsing of said exception output said parse elements, or the subsequent insertion of said semantic units into said fractal semantic network.

28. The system of claim 27, wherein said special tool enables human interaction with the system.

29. The system of claim 20, comprising a memory with lexical information for consideration during said parsing step.

30. The system of claim 20, comprising a memory with grammar rules for consideration during said parsing step.

31. The system of claim 20, wherein said first set of mapping rules is accessible by said processing module, and wherein said first set of mapping rules defines that semantic units representing nouns, verbs, subordinary conjunctions, or prepositions are mapped into said information objects.

32. The system of claim 20, wherein said second set of mapping rules is accessible by said processing module, and wherein said second set of mapping rules defines that semantic units representing determiners, adverbs, adjectives, and infinitive to are mapped into attribute objects.

33. The system of claim 20, wherein said fractal semantic network is a first guess of said input string's words.

34. The system of claim 20, further comprising an output device which provides said fractal semantic network to another system or software module.

35. The system of claim 20, further comprising an input device which allows human interaction.

36. A text processing system comprising a system according to claim 20.

37. A speech processing system comprising a system according to claim 20.

38. A program storage device readable by machine, tangibly embodying a program of instructions executable by the machine to perform method steps for processing an input string to generate a fractal semantic network, said method comprising the steps of:

parsing said input string to generate an initial parse structure comprising a plurality of parse elements;

generating semantic units from some of said parse elements by employing a set of mapping rules which maps certain types of parse elements into said semantic units, whereby some of said semantic units are information objects and some are connection objects; and generating said fractal semantic network by arranging said information objects and said connection objects in a fractal manner, where the relation between said information objects is represented by said connection objects, whereby said information objects and said connection objects are derived from a small set of basic building blocks.

39. The program storage device of claim 38, wherein said parse elements comprise a classifier characterizing the type of said parse element, and a representation describing the relation between said parse elements, and feature information describing the features of said parse element.

40. The program storage device of claim 38, wherein there are hierarchical connection objects and non-hierarchical connection objects.

41. The program storage device of claim 40, wherein due to the fact that hierarchical connection objects are employed, said fractal network structure has at least two levels of hierarchies.

42. The program storage device of claim 38, wherein an exception output is generated for those portions of said input string that cannot be parsed into parse elements or that do not seem to fit into said fractal semantic network.

43. The program storage device of claim 42, whereby said exception output can be processed by a special tool to allow a subsequent parsing into parse elements or a subsequent inclusion in said fractal semantic network.

44. The program storage device of claim 43, whereby said special tool allows human interaction.

45. The program storage device of claim 38, wherein a syntactic analysis and/or a semantic analysis of said input string is performed during said parsing step.

46. The program storage device of claim 38, wherein said set of mapping rules comprises a first set of rules which define that parse elements representing nouns, verbs, qualifiers, subordinary conjunctions, or prepositions are mapped into said information objects, and a second set of rules which define that parse elements representing determiners, adverbs, adjectives, and infinitive to are mapped into attribute objects.

* * * * *